April 17, 1928.  
R. G. COTTIER  
1,666,555  
MACHINE FOR LAYING BRICKS  
Filed Nov. 20, 1924  
2 Sheets-Sheet 1
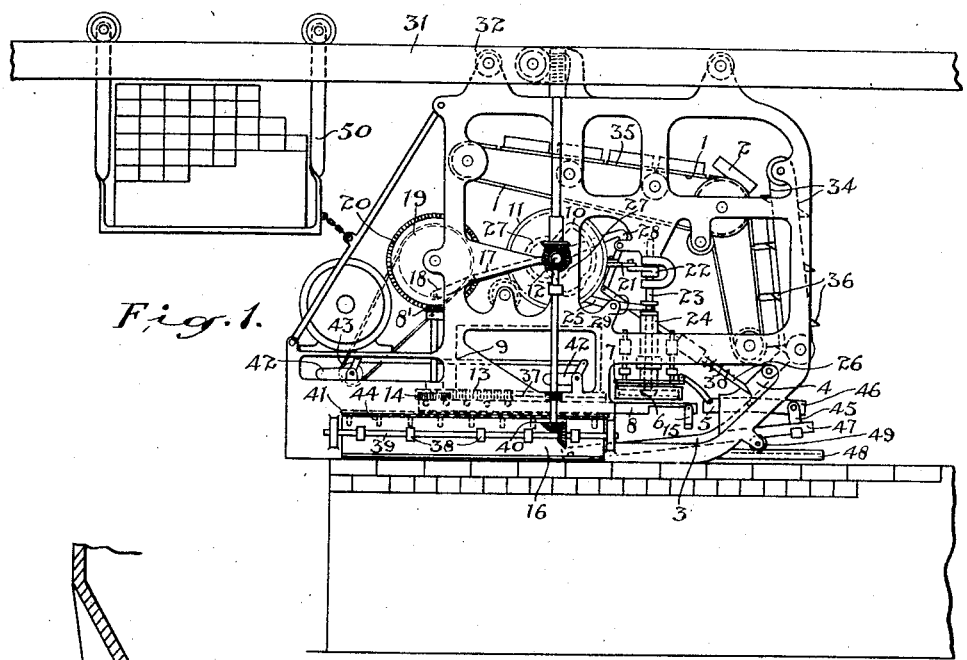

April 17, 1928.
R. G. COTTIER
1,666,555
MACHINE FOR LAYING BRICKS
Filed Nov. 20, 1924
2 Sheets-Sheet 2
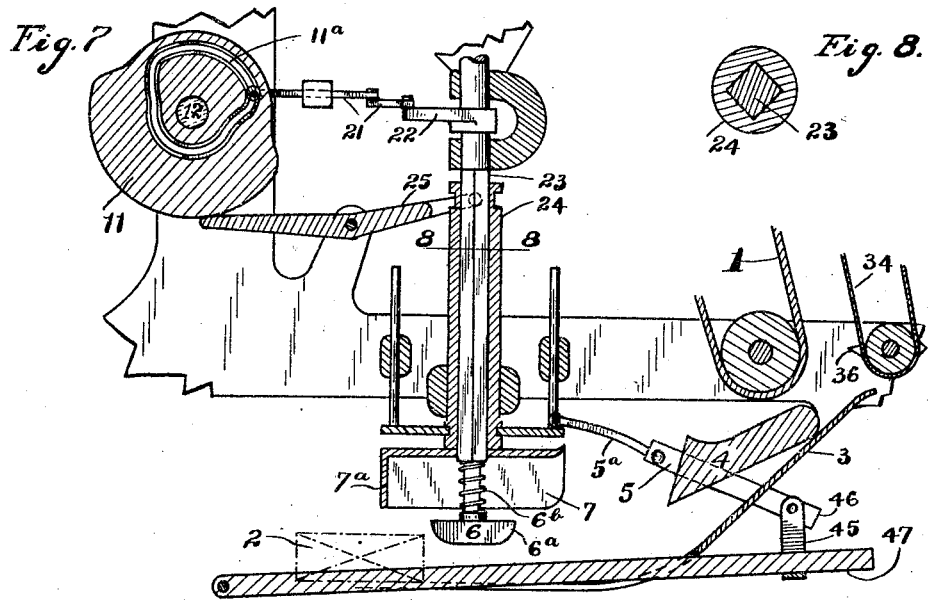
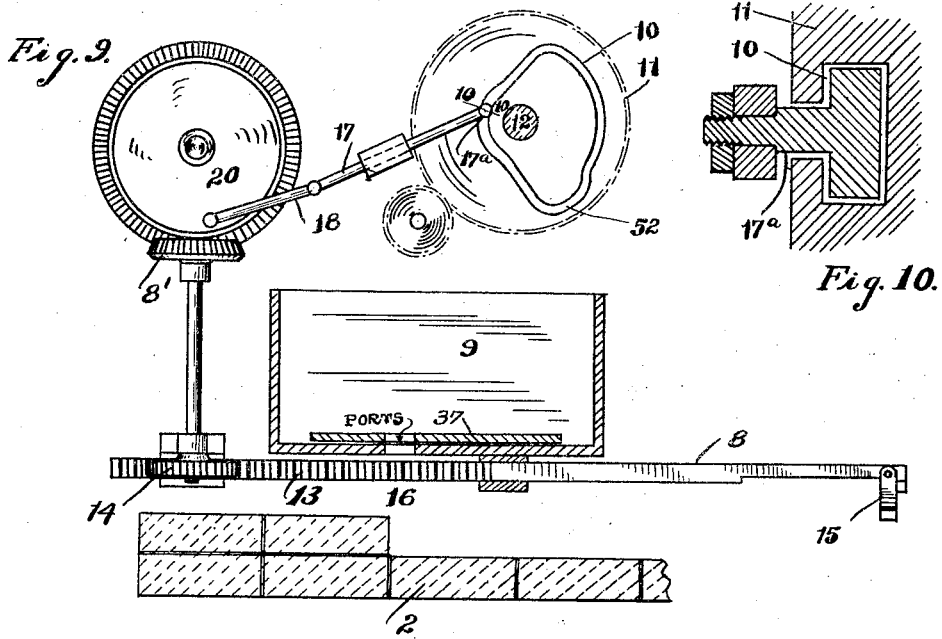
Inventor,
Robert G. Cottier
By Frederick E. Bromley
Attorney.

Patented Apr. 17, 1928.

1,666,555

UNITED STATES PATENT OFFICE.

ROBERT G. COTTIER, OF BRADFORD, ONTARIO, CANADA.

MACHINE FOR LAYING BRICKS.

Application filed November 20, 1924. Serial No. 751,093.

The invention relates to machines for laying bricks as described in the present specification and shown in the accompanying drawings which form part of the same.

The invention appertains to machines for erecting brick walls of buildings or the like and more particularly to a machine adapted to move along a horizontal guideway and to be raised or lowered by any suitable means.

According to the invention bricks are placed lengthwise upon a gravity band conveyor which feeds them to a chute where a trip mechanism operates to effect their release in timed relation to the rest of the apparatus. Upon release the bricks slide onto a flat steel plate from which they are taken and pushed by pusher rods to the place where they are to be finally set. Since the bricks travel lengthwise they are laid in what is ordinarily termed "stretchers" except that when it is desired that they be laid transversely of the wall under construction a turning device is brought into action which receives them as they gravitate down the chute and turns them crosswise, whereupon the pusher rods advance them to their final position as "headers." In advance of each brick reaching its setting point mortar emanates from a hopper in order to fill the joints of the bricks.

They are then pressed to their correct position by means of lateral and vertical presser plates. The machine is intended to be progressively advanced the length of a stretcher or header according to which of the two is being laid.

A characteristic of this machine is that the hopper is above the part into which the bricks are fed or, in other words, is positioned over and above the place where the bricks are laid. It has properly spaced ports in its bottom to supply the mortar to the bricks either by gravitation or by force feed, such as a worm, the efflux being controlled by a plate designed to either close or open the ports according to its position.

A distinctive feature of the invention is that a turning device is utilized for the purpose of changing the disposition of the bricks when required as headers, and when not in operation the bricks are ordinarily fed as stretchers, being guided by a bar which is raised above the surface upon which the brick rests.

Referring to the drawings, Figure 1 is an elevation of a machine embodying the present invention, certain parts being removed whilst others are shown more or less diagrammatically.

Figure 2 is a sectional elevation on an enlarged scale depicting a part of the hopper with the pusher rods therebelow and a plate at one side for laterally pressing bricks flush with the vertical face of the wall under construction.

Figure 3 is a detail plan view showing the turning device and cooperating deflecting members for guiding bricks into the same.

Figure 4 is a diagrammatic view of mechanism for turning the machine bodily from the horizontal guide of one wall to the horizontal guide of another wall.

Figure 5 is a horizontal sectional view through the hopper illustrating the member for controlling the efflux of the mortar.

Figure 6 is a part plan of the main drive of one unit.

Figure 7 is a vertical sectional view through the turning device in its raised or inoperative position. In this view is shown the chute with the deflecting members raised and the lower part of the conveyor.

Figure 8 is a section on line 8—8 of Figure 7.

Figure 9 is a vertical section showing a pusher rod and the cam mechanism whereby it is actuated. This view is illustrative of the hopper and the space or receptacle therebelow into which the bricks are fed, other parts of the machine being omitted.

Figure 10 is a sectional view on the line 10—10 of Figure 9 giving a typical illustration of the manner in which the followers are guided in their cam grooves.

Like numerals of reference indicate corresponding parts in each of the figures throughout the drawings.

According to the present invention, the various parts of the machine are intended to be mounted in a main frame as shown in Figure 1 which is suspended from horizontal guides as at 31 and has a pinion 32 whereby power is taken off for the purpose of automatically propelling or advancing the machine along as the bricks are laid. A turntable 33 (Fig. 4) is to be provided on the horizontal guides to turn the machine when it is required to operate along another wall. It is to be understood that the guides 31 shall be progressively elevated as each course of brick is laid, and lowered for commencing building operation on a new wall. Mechanism for achieving the foregoing objects is not detailed since it does not constitute a part of the present invention.

Coming now to the machine proper, this will be described in the chronological order of its cooperating units. The reference numeral 1 designates generally a travelling band sloping gradually to a point from which it drops vertically to a chute 3 and spaced from its erect portion is an auxiliary conveyor band 34. The endless band 1 has longitudinal spacing pieces 35 placed at intervals throughout its length, while the other band has transverse spacing pieces 36 disposed opposite to the adjacent ends of the pieces 35 so as to form therewith compartments each designed to hold one brick. The bricks 2 are placed lengthwise upon the band 1, being fed manually or otherwise from a carrier 50; which band conveyor is set in operation by gravity, i. e. the weight of the bricks. The spacing pieces 35 and 36 retain the bricks in place while they are being conveyed to the head of said chute.

It is evident that if so desired both the longitudinal and the transverse spacing pieces could be mounted upon the same band and also that any number of bricks could be placed side by side on the band so that they would be fed in a plurality to the chute; however, in the preferred form they are fed in pairs.

The inclined surface of the chute is divided intermediate of its width by a guide plate 4. The passageway thus formed on each side of the plate is in alignment with one line of compartments of the conveyor to the end that it receives bricks lengthwise for delivery as stretchers.

The bricks are held at the top of the chute by means of a trip piece 26, one to each passageway. Each of these trips operates to release bricks one-by-one in order to time their arrival at the bottom of the chute and regulate the feed of same.

Each trip element is independently operated by the main drive which indirectly actuates the mechanism of each unit. Each trip element comprises the trip-piece 26 slidably held by a spring 30 in one of the passageways so as to obstruct same. Said trip-piece is connected to a bellcrank lever 25 by means of a rod 29. One part of the lever engages a cam 27 mounted on the main power shaft which will be dealt with more fully hereinafter.

As bricks are released they gravitate down the chute to the bottom which merely consists of a flat steel plate, see Figures 3 and 7, where they are drawn by pusher rods into a receptacle beneath the mortar hopper and subsequently pushed into final position.

When it is desired to have the bricks turned from their normal position of stretchers in order to lay them as headers the turning device is brought into operation and the bricks after they have passed down the chute turned crosswise prior to their being engaged by the pusher-rods. This turning device comprises movable deflecting plates 5 which converge so as to guide a brick gravitating from either side of the guide plate 4 to a position midway of the width of the chute. The momentum of a deflected brick is dampened or dissipated by a spring check piece 6 and by the end of a box that constitutes the turning device 7.

As clearly shown in Figure 7, the check piece consists of a block of metal having its ends rounded off as at $6^a$ in order to present an inclined face to an impinging brick and is held in the path of same by a spring $6^b$ from which it derives its name "spring check piece". Said check piece is positioned in alignment with the guide plate 4, or in other words between the two pathways of the chute through which stretchers pass when not deflected, hence it should be clearly understood that it does not contact or interfere with bricks unless they are deflected to a medial position for turning.

Adverting to the turning device proper, or box 7, this is a box-like structure adapted to receive a brick endwise as it is diverted by the deflecting members 5, the adjacent end being open for this purpose, while the other end $7^a$ is closed. The bottom is also open in order that the box may be raised clear of the brick when turned.

Carrying the spring check piece 6 is a vertical shaft 23 suitably journaled in the machine frame, but held against endwise movement. The upper end of the shaft carries a rigid crank 22 which in turn is pivoted to a rod 21, the pivoted end of which is in link form while the major part is slidably mounted in a bearing for reciprocal movement. The other end of the rod is a follower that operates in a cam groove $11^a$ provided in one side of the cam wheel 11 affixed to the main power shaft 12. The throw of the cam groove is such that a quarter turn is imparted to the shaft 23.

Slidably mounted on the shaft 23 is a sleeve 24 which is keyed thereto so that it will turn with it. The key means consists of making the shaft or at least a goodly portion of it, of a square cross-section and correspondingly shaping the bore of the sleeve, as detailed in Figure 8. The lower end of the sleeve is rigidly affixed to the turning device proper, or box 7, and to the deflecting elements 5 by means of links $5^a$ which raise and lower same, whereas the upper end is associated with one extremity of a lever or what is frequently termed a shifting fork 25. The other end of the lever engages the cam perimeter of the wheel 11.

The turning device operates as follows: As the cam wheel 11 rotates, the shift fork 25 lowers the sleeve 24 which in turn lowers the box 7 synchronously with the deflecting members 5. The next stretcher released by the trip 26 is diverted into the box, its momentum being checked by the check piece 6 which bears thereupon. The box is then turned through an angle of 90°, converting the brick into a header, by means of the crank, rod and cam groove 11ª; whereupon the shift fork raises the box and deflecting members to an inoperative position, and the cam groove 11ª returns the box to its normal position again.

The turned bricks are drawn into the receptacle similarly to the unturned bricks but with the difference that this is accomplished by the two pusher rods instead of one. This will be evident since a turned brick will lie across the two passageways of the chute 3, in each of which passageways a pusher rod 8 operates (see Fig. 2), which, when stretchers are being handled, engage their rear ends.

It might be mentioned in this connection that by reason of the pusher rods being on each side of the check piece 6 they do not interfere therewith in their motion of transition; moreover inasmuch as the turning device operates during the interval in which the pusher rods are at a point of travel removed from below the box 7, same also does not occasion any interference.

The pusher rods are suitably mounted in bearings for horizontal reciprocal movement whereby they pass over the bricks, being actuated by means of a rack 13 and pinion 14. One end of each of the pusher rods carries pivoted pieces 15 which fall down behind the brick by gravity and abuttingly engage it in order, as the pusher rod is on its forward stroke, to draw it into the receptacle 16 beneath the hopper 9. On the return stroke these pieces 15 pass freely over the next brick until they fall by gravity behind it for recurrent operation.

In order to assist the pusher rods in drawing bricks into the receptacle it is proposed to employ a series of bars 48 longitudinally arranged and fastened to one another to constitute a table which receives the bricks as they leave the flat plate of the chute and travels with them towards the receptacle, but stops and recedes before the bricks are finally positioned. The withdrawal of the bars takes place while the pusher rod is held motionless by a dowel in a cam (yet to be described) which subsequently forces the brick home. The bars 48 may be moved to and fro in any manner found expedient, and have a lengthwise guide or guides 47 pivoted at the frontal end to said bars so as not only to move with same but also to have a vertical up and down movement. Each guide in its raised position is supported at its rear end by a hook 45 depending from a member 46, and is in line with the guide pieces 4, before mentioned. The sole function of this guide 47 is to direct the bricks that come into the container or receptacle part longitudinally, to wit, as stretchers. To accomplish this it is raised and supported by the hook 45, a slot being cut in the flat steel plate of the chute to let it project thereabove—see more particularly Figure 7. With a view to gaining a clear understanding of this guide it should be noted that it is only used when stretchers are being laid, that is, when the turning device is in disuse.

Coming now to the mechanism for operating the pusher rods, this consists of separate units of identical construction, one for each pusher rod, so that each is independently operable. Each unit comprises a rod 17 reciprocably supported in a bearing. One end of said rod is a follower 17ª that operates in a groove 10 provided in the side of the cam wheel 11 opposite to that which has the groove 11ª for oscillating the turning device. Each of said grooves is of a T-shaped cross-section as detailed in Figure 10, for guiding the followers. The other end of the rod 17 is pivoted to a crank arm 18 which in turn is pivoted to a large bevel gear 20. The bevel gear meshes with a pinion 8' that transmits motion through a shaft to the spur gear 14 that operates the rack 13 of the respective pusher rod.

By this construction it is evident that each revolution of the cam wheel 11 causes a reciprocation of the rod 17, which through its crank arm 18 oscillates the bevel gear 20. Since the gear 8' meshes with said gear it is operated by the oscillatory movement and in turn actuates the rack 13 by means of the gear 14 thus effecting a reciprocation of the pusher rod 8.

The dwell 52 in the cam groove 10 is merely a portion of the groove of which every point lies at the same distance from the centre of rotation, so that no motion is transmitted to the follower 17ª as this part of the cam passes it, and in this manner the dwell functions to permit the pusher rod to come to a standstill momentarily before finally pressing a brick to its correct setting. This dwell is used for the purpose of depositing mortar between the brick joints so that when it is eventually pressed home it has a proper bond. The withdrawal of the bars 48 on which the bricks move into the receptacle takes place while the pusher rod is held motionless by the dwell in the cam. Said withdrawal permits the bricks to drop onto the mortar surface of the last laid course of bricks.

Referring more particularly to Figures 2, 5 and 9, the hopper 9 has properly spaced openings, or ports, in its bottom to discharge the mortar, said openings being controlled by a cover plate 37 which is correspondingly apertured so that when these apertures are in register with those of the hopper the mortar is free to flow therefrom. Owing to the proximity of the ports comparatively little passes when the opening is above the bricks, but when the opening comes between the bricks sufficient passes to fill the joints. It will be apparent to those skilled in the art that the ports may be varied in practice to give the best results according to existing conditions; moreover if desired they could be designed to open twice to each movement of the entire machine, the first time to deposit mortar for the bricks about to be laid, and the second time to fill the spaces between the vertical joints of the bricks; the openings, or ports, being closed while the bricks are being introduced.

It will be readily understood that mechanism is to be provided for the purpose of actuating the cover plate 37 in timed relation to the pusher rods, which mechanism is illustrated by way of example, but not of limitation, as comprising an eccentric 37' connected to the cover plate for inducing it to move diagonally, the eccentric being suitably driven from the main driving shaft 12 through the medium of mechanism similar to that detailed.

The bricks as they are laid are pressed both laterally and vertically to their proper positions. The lateral pressing is accomplished by means of a compressor plate 68 at each side of the wall, one opposing the other. Said plates are spring-urged to a normal inactive position (see Fig. 2). Pressure is applied to the plates by cams 38 mounted on a shaft 39 that is driven by gearing 40, power being taken off the main shaft 12, as illustrated. The pressure vertically downwards to press the bricks to their proper level in the mortar is supplied by a plate 41 having projecting pieces 44 above the bricks and below the level of the pusher rods, the plate being operated by means of cams 42 and gearing 43 driven as at 19 or otherwise. The projections 44, when the plate is depressed by the action of the cams, engage the top of the bricks to place them in their final positions with respect to the level of the course being laid. Mortar that is squeezed upwards from between the bricks passes between the projections so that operation of the machine is not obstructed.

In the preferred form of the invention, the lateral and vertical pressing is done when the machine has advanced from the position it occupied while laying the bricks to be pressed to the position it is to occupy when laying the ensuing bricks. However, if so desired the laying and pressing of the bricks could be done before the machine is advanced horizontally to its next position, or in other words while the machine occupies a single position.

From the foregoing description it will be seen that the receptacle 16 is simply the space enclosed by the bottom of the hopper 9, the lateral presser plate 68 and the top surface of the uppermost course of bricks last laid. Furthermore it will be self evident that since the bricks delivered down each passageway of the chute are handled by separate units driven by the main power shaft 12, any thickness of a wall may be built by merely increasing the number of the units and passageways. Also by making the pusher rods adjustable with regard to their racks 13, any pusher rod may be set so as to reach the limit of its forward stroke one half a brick's length behind the others. By so doing the bricks may be laid in the customary overlapping formation, and variations of joints made without departing from the spirit and scope of the invention. Moreover, when the machine is used to construct a wall narrower than it is designed for, the lateral presser plates may have members affixed thereto in order to compensate for the difference in thickness of the wall.

What I claim is:—

1. The combination in a brick laying machine, a chute for delivery of bricks lengthwise as stretchers and a turning device disposed at the bottom of the chute adapted to turn the bricks crosswise when required as headers.

2. The combination in a brick laying machine, a chute divided into a plurality of passageways for delivery of bricks lengthwise as stretchers, a deflecting mechanism for diverting bricks from any of the passageways to a common passageway and a turning device therefor adapted to turn bricks crosswise for subsequent delivery as headers.

3. The combination in a brick laying machine, a chute divided into a plurality of passageways for delivery of bricks lengthwise as stretchers, a deflecting mechanism for diverting brick from any of the passageways to a common passageway, a turning device adapted to turn deflected bricks crosswise and means for bringing the deflecting mechanism and the turning device in and out of operation.

4. The combination in a brick laying machine, a chute divided into a plurality of passageways for delivery of bricks lengthwise as stretchers, a deflecting mechanism for diverting brick from any of the passageways to a common passageway, a turning device adapted to turn deflected bricks crosswise and means for normally holding the deflecting mechanism and the turning device in an elevated inoperative position and for lowering same to an operative position.

5. The combination in a brick laying machine, a chute divided into a plurality of passageways for delivery of bricks lengthwise as stretchers, a deflecting mechanism for diverting brick from any of the passageways to a common passageway, a turning device adapted to turn deflected bricks crosswise, and cam actuated mechanism for normally holding the deflecting mechanism and the turning device in elevated inoperative positions and for lowering same to an operative position.

6. In a brick laying machine the combination, a chute having a plurality of passageways for delivery of bricks lengthwise as stretchers, a deflecting device for diverting bricks from any of the passageways to a common passageway and a turning device adapted to turn deflected bricks crosswise, said turning device comprising a box-like member having a rear end and side walls, the front being open to admit bricks and the bottom being open to allow the box to be raised clear thereof, means for turning the box through a right angle and back again, and cam actuated mechanism for raising and lowering both the deflecting device and the said box.

7. In a brick laying machine the combination, a chute having a plurality of passageways for delivery of bricks lengthwise as stretchers, a deflecting device for diverting bricks from any of the passageways to a common passageway and a turning device adapted to turn deflected bricks crosswise, said turning device comprising a box-like member having a rear end and side walls, the front being open to admit bricks and the bottom being open to allow the box to be raised clear thereof, a spring-urged check piece disposed in the path of deflected bricks, means for turning the box through a right angle and back again, and cam actuated mechanism for raising and lowering both the deflecting device and the said box.

8. In a brick laying machine, the combination, a chute having a plurality of passageways for delivery of bricks lengthwise as stretchers, a deflecting device for diverting bricks from any of the passageways to a common passageway and a turning device adapted to turn deflected bricks crosswise, said turning device comprising a box-like member for receiving deflected bricks endwise, a slidably mounted sleeve carrying said box, means for operably connecting the deflecting device to said sleeve, cam mechanism for turning the sleeve through a right angle and back again and like means for raising and lowering said sleeve.

9. In a brick laying machine the combination, a chute having a plurality of passageways for delivery of bricks lengthwise, deflecting plates for diverting brick from any of the passageways to a common passageway and a turning device adapted to turn deflected bricks crosswise, said turning device comprising a box-like member for receiving deflected bricks endwise, a slidably mounted sleeve carrying said box, links connecting the deflecting plates to said sleeve, and means for turning and elevating the sleeve.

10. In a brick laying machine the combination, a chute having a plurality of passageways for delivery of bricks lengthwise as stretchers, a deflecting device for diverting bricks from any of the passageways to a common passageway and a turning device adapted to turn deflected bricks crosswise, said turning device comprising a box-like member for receiving deflected brick endwise, a slidably mounted sleeve carrying said box, means connecting the deflecting device to the sleeve, a shaft keyed to said sleeve but not slidable therewith, a crank arm affixed to said shaft, cam mechanism for oscillating the crank arm, and articulate means for elevating the sleeve.

11. In a brick laying machine the combination, a chute having a plurality of passageways for delivery of bricks lengthwise as stretchers, a deflecting device, for diverting bricks from any of the passageways to a common passageway and a turning device to turn deflected bricks crosswise, said turning device comprising a box-like member for receiving deflected brick endwise, a slidably mounted sleeve carrying said box, means connecting the deflecting device to the sleeve, a shaft keyed to said sleeve but not slidable therewith, a crank arm affixed to said shaft, a reciprocal rod linked to said crank arm, a cam connected to the other end of said rod, and articulate means for elevating the sleeve.

12. In a brick laying machine the combination, a chute having a plurality of passageways for delivery of bricks lengthwise as stretchers, a deflecting device for diverting bricks from any of the passageways to a common passageway and a turning device adapted to turn deflected bricks crosswise, said turning device comprising a box-like member for receiving deflected brick endwise, a slidably mounted sleeve carrying said box, means connecting the deflecting device to the sleeve. a shaft keyed to said sleeve but not slidable therewith, cam mechanism for oscillating the shaft, a shift fork connected to the sleeve, and a cam for operating the said shift fork.

13. The combination in a brick laying machine, of a chute divided by a guide into separate passageways for delivery of brick lengthwise as stretchers, a deflecting mechanism situated at the inclined face of the chute for diverting brick from one or the other of the passageways to a position medially thereof, a turning device disposed over and above the bottom of the chute for turning deflected brick crosswise, means for elevating the deflecting mechanism and the turning device to inoperative positions, and a guide bar adapted to be raised above the surface of the chute bottom when the turning device is not in use so as to form a continuation of the foregoing chute guide.

14. The combination in a brick laying machine of a chute divided by a guide into separate passageways for delivery of brick lengthwise as stretchers, a deflecting mechanism situated at the inclined face of the chute for diverting brick from one or the other of the passageways to a position medially thereof, a turning device disposed over and above the bottom of the chute for turning deflected brick crosswise, means for elevating the deflecting mechanism and the turning device to inoperative positions, and a guide bar pivoted at its frontal end and adapted to be sustained at its rear end by a hook in a position above the surface of the chute bottom when the turning device is not in use so as to form a continuation of the foregoing chute guide.

15. A brick laying machine adapted to be progressively moved along a horizontal guideway, said machine comprising a conveyor, a chute for receiving bricks therefrom, a trip piece for regulating the feed of bricks down the chute, a main cam unit, reciprocable mechanism operated thereby for withdrawing the trip piece from the passageway of the chute, a mortar hopper, pusher rods for advancing bricks from the chute to beneath the hopper, mechanism connecting said pusher rods to the aforesaid main cam unit, means for discharging mortar from the hopper onto bricks therebeneath and presser plates for finally setting the bricks in the wall under construction.

16. A brick laying machine adapted to be progressively moved along a horizontal guideway, said machine comprising a conveyor, a chute for receiving bricks therefrom, a trip piece for regulating the feed of bricks down the chute, a main cam unit, reciprocable mechanism operated thereby for withdrawing the trip piece from the passageway of the chute, a mortar hopper, pusher rods for advancing bricks from the chute to beneath the hopper, mechanism connecting said pusher rods to the aforesaid main cam unit, means controlled by said cam unit for discharging mortar from the hopper onto bricks therebeneath and presser plates for finally setting the bricks in the wall under construction.

17. A brick laying machine adapted to be progressively moved along a horizontal guideway, said machine comprising a conveyor, a chute for receiving bricks therefrom, a trip piece for regulating the feed of bricks down the chute, a main cam unit, reciprocable mechanism operated thereby for withdrawing the trip piece from the passageway of the chute, a mortar hopper, pusher rods for advancing bricks from the chute to beneath the hopper, mechanism connecting said pusher rods to the aforesaid main cam unit, means controlled by said cam unit for discharging mortar from the hopper onto bricks therebeneath, and vertical and lateral presser plates also operated by connection to said cam unit.

ROBERT G. COTTIER.